United States Patent [19]

Roger et al.

[11] Patent Number: 4,636,633
[45] Date of Patent: Jan. 13, 1987

[54] DOCUMENT SENSING APPARATUS THAT DETECTS NON-SPECULAR REFLECTED LIGHT

[75] Inventors: Stephen J. Roger, Livingston; John D. Bryant, Whitburn; Philip Wong, Kettering, all of Wales

[73] Assignee: Burroughs Corporation, Detroit, Mich.

[21] Appl. No.: 611,575

[22] Filed: May 18, 1984

[30] Foreign Application Priority Data

Dec. 10, 1983 [GB] United Kingdom ............... 8333022

[51] Int. Cl.[4] .................. G01N 9/04; G06M 7/00; H01J 40/14
[52] U.S. Cl. ................................ 250/223 R; 356/446
[58] Field of Search ............... 250/221, 223, 557, 561; 356/446, 447, 448; 271/258, 259, 261, 265

[56] References Cited

U.S. PATENT DOCUMENTS

| | | | |
|---|---|---|---|
| 4,207,466 | 6/1980 | Drage et al. | 250/221 |
| 4,484,070 | 11/1984 | Inoue | 250/223 |
| 4,540,887 | 9/1985 | Minerd et al. | 250/223 |

Primary Examiner—David C. Nelms
Assistant Examiner—William L. Oen
Attorney, Agent, or Firm—Mervyn L. Young; Kevin R. Peterson

[57] ABSTRACT

In a stop-and-display station in document-handling equipment wherein a document in a track is stopped and viewed through a transparent first wall, whereagainst it is supported by a non-transparent second wall, a reflective photosensor assembly is angled relative to the back wall such that a light beam from a light-emitting diode cannot be specularly reflected onto a phototransistor either from a document or from the inner surface of the transparent first wall. The phototransistor intercepts a portion of the scatter-reflected light from the document. The light from the light-emitting diode is modulated with a predetermined frequency, and the output signal from the phototransistor is filtered by a band-pass filter before threshold detection to provide indication of the presence of a document. A turn-off delay circuit prevents loss of indication of the presence of a document unless signals from the phototransistor have been absent for longer than a predetermined period. The apparatus resists false alarms of the presence of a document in consequence of extraneous light and extraneous reflections. The turn-off delay circuit prevents marks on the back face of the document inadvertently causing loss of signal indicative of document presence.

28 Claims, 9 Drawing Figures

DOCUMENT SENSING APPARATUS THAT DETECTS NON-SPECULAR REFLECTED LIGHT

BACKGROUND TO THE INVENTION

1. Field of the Invention

The present invention relates to stop-and-display stations in document-handling equipment, whereat a document in the course of processing is rendered visible to a user. In particular, the present invention relates to a sensing apparatus for detecting the presence of a document in a stop-and-display station.

2. The Prior Art

In document-handling equipment such as check-encoding equipment, it is known to provide a stop-and-display station. The document or check has data automatically read therefrom as it moves along a track. The document or check is brought to a halt in a stop-and-display station for visual inspection by a user. Whilst stopped, details recovered from the document or check can be confirmed by the user and other data not automatically recoverable can be entered into the machine by the user. In the case of check-encoders, the most frequently entered information concerns the amount of the check which, being hand-written, cannot be the subject for automatic reading by the machine. Further, the machine displays those details which it has automatically read from the check and, if there is any discrepancy between what is apparent to the user upon visual inspection of the check and what the machine believes it has read, the user can correct any misread details by use of a keyboard.

The construction of a stop-and-display station in general consists in a transparent glass wall, and a rear support wall wherebetween a document can be moved and stopped in a track. when a document is in the stop-and-display station, it is customary to provide a sensor which, sensing the presence of a document, signals to the control system in the check-encoding equipment that a document is stopped in the stop-and-display station. The control system in the check-encoding equipment performs different functions dependently upon the position of the document in its path through the machine. In the earlier stages of the passage of a document through a check-encoder, the control system controls and monitors the automatic reading of characters written upon the document. When the document or check is in the stop-and-display station, the control system must prepare itself to receive new information and to receive correction to any characters, automatically read from the check or document, which may be in error. Thus, when a sensor senses the presence of a check or document in the stop-and-display station, the control system responds to indication from the sensor by preparing to receive information via a keyboard. The automatic acceptance of keyboard data if and only if a document or check is present in the stop-and-display station, eases the burden on the user and prevents erroneous entry of data at other times.

It is known to detect the presence of a document or check in the stop-and-display station by means of a reflective optical sensor. The reflective optical sensor comprises a light source and a photodetector. The optical sensor is situated in the support wall of the stop-and-display station so that it is behind the document and is visible through the transparent wall whenever the document or check is in the stop-and-display station. The light source sends a beam of light up to the rear of the document, which beam is reflected by the document onto the photodetector. The mean level of light received by the photodetector is compared with a reference level and, when the reflected light exceeds a predetermined limit, indication is given to the control system that a document is present.

Problems exist with this scheme. Firstly, when a document is not present in the stop-and-display station, the photodetector can still pick up ambient background lighting through the transparent glass wall wherethrough the document or check is to viewed. Should ambient intensities become too great, a false indication is provided of a document being present when, in fact, there is not document or check in the stop-and-display station. Again, when no document is present, the beam of light from the light source can be reflected from the transparent wall's inner surface onto the photodetector to give an erroneous document presence indication.

It is important in the operation of photodetectors to provide an acceptably high signal-to-noise ratio. The signal-to-noise ratio is defined as the amount of light increase incident upon the photodetector when a check or document is present compared with the incident light upon the photodetector when no document is present. Even if the above described mechanisms do not cause an erroneous indication of document presence to be generated, they have the effect of degrading the signal-to-noise ratio seen by the photodetector making it a matter of some difficulty to select the threshold of incident light intensity whereabove the decision is taken that a document is present. This alone can cause malfunctioning of the sensing system.

It is therefore desirable to provide a document-sensing system for a stop-and-display station in document-handling or check-encoding equipment which is resistant to the effects of ambient lighting incident upon the photodetector through the transparent display wall, and which is also resistant to the effects of reflection from the inner surface of the transparent display wall.

3. Summary of the Invention

Specular reflection is hereinafter defined as reflection of a light beam wherein the angle of incidence onto the reflective medium is equal to the angle of reflection from the reflective medium. Specular reflection is therefore reflection in the manner of a perfect mirror.

Scattered reflection is hereinafter defined as reflection wherein a beam of light, incident upon a scattering surface, is reflected in many directions at once. Scattered reflection is characteristic of rough surfaces and is ideally represented by the reflection of light, for instance, from matt white painted surfaces.

It is to be appreciated that no surface reflects one hundred per cent in either of the above defined manners. Smooth surfaces approximate more and more closely to specular reflection the more smooth the surface profile, whilst rough surfaces approach one hundred percent scattered reflective conditions.

The present invention consists in an apparatus for sensing the presence of a document stopped in a track in a stop-and-display station, said stop-and-display station including a first transparent wall wherethrough the document can be viewed and a second wall for supporting the document against said first wall, said apparatus comprising: a light source in said second wall for projecting a beam of light, intensity-modulated with a predetermined frequency, at a predetermined angle of incidence onto a document intermediate between said first and second walls; a photosensor, also in said second wall, positioned to intercept light from said beam scattered by the document without intercepting light from said beam specularly reflected by the document, said photosensor being operable to provide an output signal representative of the instant intensity of light incident thereon; a band-pass filter coupled to receive as input said output signal from said photosensor and operable to provide as output those components of its input lying within a predetermined range of said predetermined frequency; and a threshold detector, coupled to receive said output of said band-pass filter, and operable to provide output, indicative of a document being intermediate between said first and second walls at each instance of each cycle of said output of said band-pass filter exceeding a predetermined amplitude.

4. Brief Description of the Preferred Embodiment

In a preferred embodiment of the invention, a check is moved along a track by any known means between a first transparent wall and a second support wall. The document is preferably stopped in the track by means of a solenoid insertable and withdrawable pin.

A reflective photosensor is provided in the secnd support wall. The reflective photosensor comprises a light source and a photodetector, the light source and the photodetector being angled to view a common area on the check or document. The reflective photosensor assembly is angled relative to the second support wall such that the beam of light from the light source cannot be returned by specular reflection from the document or the inner surface of the first transparent wall onto the photodetector. The photodetector can only intercept a portion of the scattered reflected light beam returned from the rough surface of the check or document.

The intensity of the light source is modulated at a predetermined frequency by means of a clock generator circuit and a driver circuit. The intensity of the light source is preferably one hundred per cent modulated. The photodetector provides an output representative of the instant radiation intensity incident thereon, which output changes sufficiently quickly for the modulated scattered reflected light at the predetermined frequency to be detected. The output of the photodetector is coupled to a band-pass filter which provides as its output only those components of the output of the photodetector lying within a predetermined range of frequencies about the predetermined frequency. The output of the band-pass filter is coupled to a threshold detector which detects when the output of the band-pass filter exceeds a predetermined amplitude. The output of the threshold detector thus is indicative of more than a predetermined amount of scattered light from the light source reflected from a document being incident upon the photodetector. The output of the threshold detector is therefore indicative of a document being present intermediate between the first and second walls of the stop-and-display station.

The output of the threshold detector is a logically-true signal for each occasion that a cycle of the waveform from the band-pass filter exceeds the predetermined threshold levels. The threshold detector circuit provides a stream of logically-true output pulses at the predetermined frequency whenever a document is present. The output of the threshold detector circuit is latched by a latch to provide a steady latch output signal for provision to the system controller to indicate to the system controller that a document is present in the stop-and-display station.

The predetermined frequency and the range of frequencies about the predetermined frequency which the band-pass filter will pass are together chosen such that no frequency component of the ambient lighting will excite the threshold detector circuit. The predetermined frequency is chosen having regard to the commonly-used excitation frequencies for fluorescent lighting of 100 Hz and 120 Hz. The predetermined frequency is chosen such that no Harmonic of 100 Hz or 120 Hz falls within the predetermined range of the band-pass filter.

In order that endorsement and marks upon the rear of the document should not cause an erroneous resetting of the latch, there is provided a turn-off delay circuit. The turn-off delay circuit prevents the resetting of the latch indicatively of no document being present if, and only if, the threshold detector circuit has not provided an output for longer than a predetermined period. In the preferred embodiment described, the turn-off delay circuit counts the number of clock cycles from the clock generator circuit which drives the light source at the predetermined frequency, and resets the latch if, and only if, three or more clock cycles are received without receiving an output from the threshold detector circuit. Counting is achieved by propagation of a logical input condition between stages in a shift register where the last stage of the shift register is the latch. The latch has its condition altered only after the third clock pulse delivered to the shift register.

A light-emitting diode is provided for giving indication to the operator that a successful document detection has taken place.

BRIEF DESCRIPTION OF THE DRAWINGS

The invention is further described, by way of an example, by the following description in conjunction with the appended drawings, in which.

DETAILED DESCRIPTION OF THE PREFERRED EMBODIMENT

Figure 1:
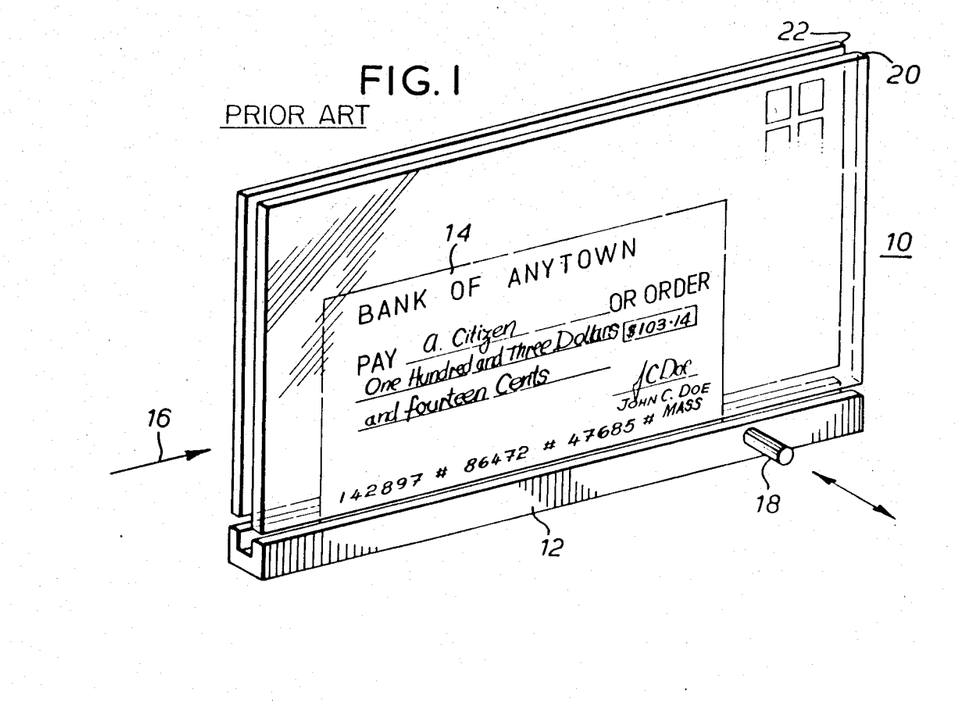
FIG. 1 shows an exemplary stop-and-display station suitable for use both in prior art systems and with the present invention.

FIG. 1 shows a stop-and-display station 10 suitable for use both in the prior art and with the present invention. The stop-and-display station 10 comprises a track 12 whereon a document or check 14 moves as indicated by a first arrow 16. The document or check 14 is stopped in the track 12 by means of a solenoid-operable pin 18. The document or check 14 is transported along the track by any means known in the art. Pairs of pinch wheel assemblies may be disposed along the track 12. The document or check 14 can be moved on an air bed, or by means of a conveyor. The pin 18 is employed merely for exemplary choice, and any other means for stopping the document or check 14 can be employed. In particular, the transport apparatus for the document or check (not shown) an simply be stopped.

The stop-and-display station comprises a first transparent wall 20. The first transparent wall 20 is preferably made of glass, but can be made of any other transparent material.

The stop-and-display station 10 further comprises a second wall 22 for supporting the check or document 14 stopped in the track 12 against the first transparent wall 20. The second wall 22 is preferably non-transparent. The second wall 22 is parallel planar with the first wall 20. When stopped between the first and second walls 20,22 the cheque or document 14 is visible to the user of the document-handling equipment, and detail on the front thereof can be read. It is to be appreciated that, where the rear wall 22 is also transparent, details from the rear of the document can be read.

Figure 2:
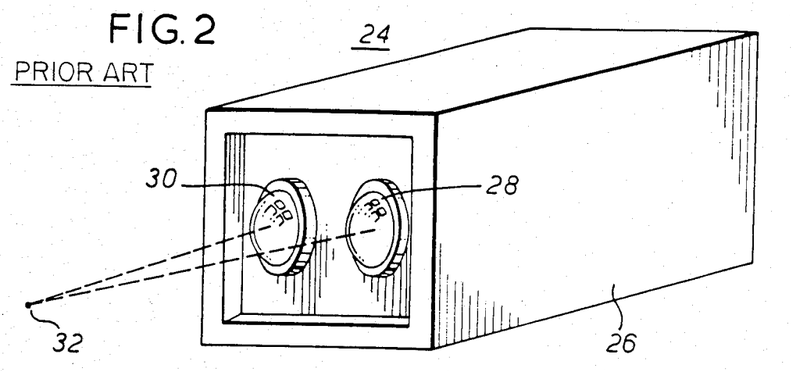
FIG. 2 shows an exemplary reflective photosensor assembly suitable for use both in prior art systems and with the present invention.

FIG. 2 shows a reflective photosensor assembly 24 suitable for use both in the prior art systems, and in the present invention.

The reflective photosensor assembly 24 comprises a support assembly 26 for the common support of a light source 28 and a photodetector 30. The light source 28 and the photodetector 30 are angled relative to one another such that they both interact with a common area 32. It is arranged both in the prior art systems and in the present invention that the common area lies on the rear surface of the check or document 14. In the preferred embodiment of the present invention, the light source 28 is a light-emitting diode focussed by means of a lens. It is to be appreciated that other light sources are usable provided they can be modulated at a sufficient speed to meet the criteria hereinafter described. Similarly, in the preferred embodiment, the photodetector 30 is a phototransistor also focussed by means of a lens. Those skilled in the art will appreciate that other forms of photodetector can be employed provided sufficient band width is available to the modulation of the light source 28. Those skilled in the art will appreciate that a restricted field of view may be given both to the light source 28 and to the photodetector 30 without the use of lenses.

Whilst in FIG. 2 the common area 32 is indicated by means of a point, it is to be appreciated that both the photodetector 30 and the light source 28 operate over a range of angles giving both width and depth to the common area 32. Thus, a target will produce a response from the photodetector 30 over a range of distances from the reflective photosensor assembly 24 and over a range of angles relative to the reflective photosensor assembly 24.

Figure 3A:
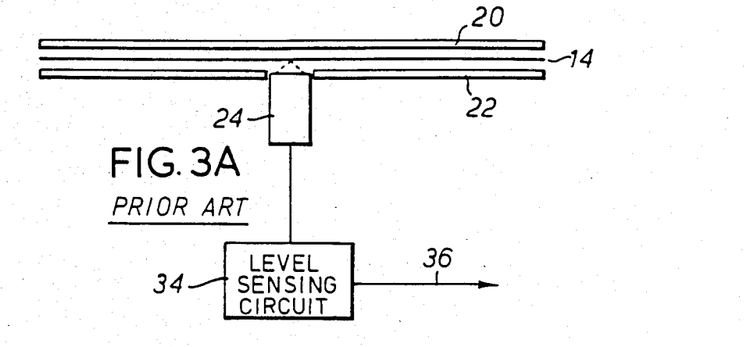
FIG. 3A shows a prior art system with a document present in a stop-and-display station.

FIG. 3A shows a prior art document-sensing system. The reflective photosensor assembly 24 is set at 90° into the second wall 22. A document or check is situated intermediate between the second wall 22 and the first wall 20.

Output from the photodetector 30 is coupled to a levelsensing circuit 34. The level-sensing circuit 34 also drives the light source 28. Whenever the light specularly reflected from the document or check 14 from the light source 28 onto the photodetector 30 exceeds a predetermined limit, output is provided on an output line 36 indicative of the document or check 14 being present in the stop-and-display station 10.

Figure 3B:
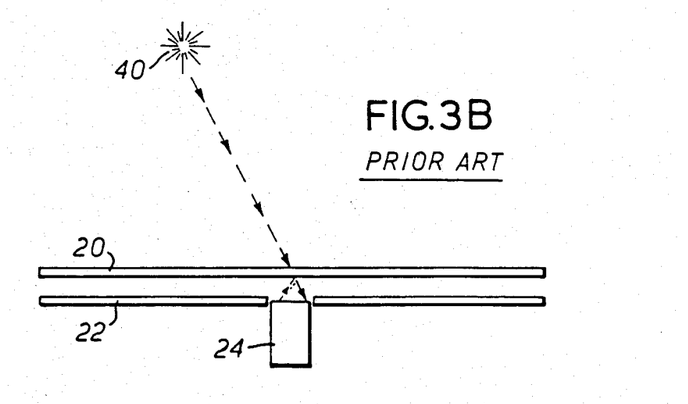
FIG. 3B illustrates the hazards prejudicial to the operation of the prior art system of FIG. 3A.

FIG. 3B is illustrative of the hazards present in prior art systems whereby false detection of a document 14 can be triggered when no document 14 is present. As a first hazard, extraneous light sources 40 can irradiate the photodetector 30 and cause a false triggering of the level-sensing circuit 34. As a second hazard, light from the ligth source 28 can be specularly reflected from the smooth inner surface of the first transparent wall 20 onto the photodetector 30 in consequence of the wide fields of view both of the photodetector 30 and of the light source 28. Both these conditions can trigger false indication of the presence of a document or check 14 and can impair the signal-to-noise ratio viewed by the photodetector 30.

Figure 4:
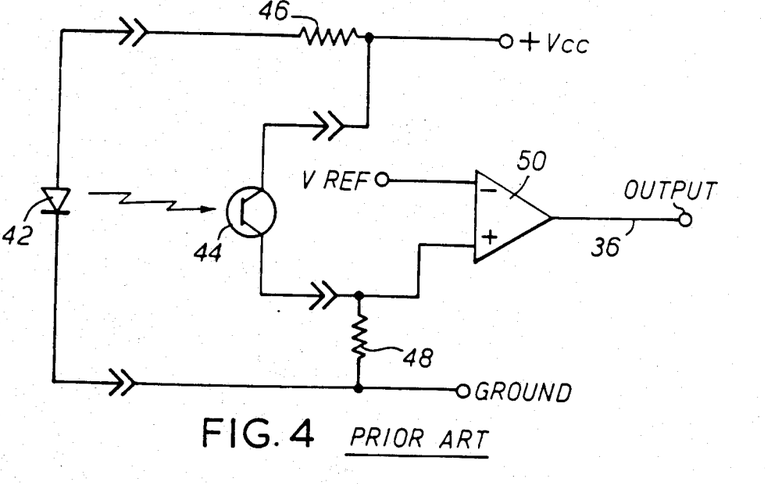
FIG. 4 shows a typical level sensing circuit employed in prior art systems.

FIG. 4 lastly shows a typical prior art level-sensing circuit 34 otherwise shown in FIG. 3A. The light source 28 is provided in the form of a light-emitting diode 42. The photodetector 30 is provided in the form of a phototransistor 44. The light emitting diode 42 is driven via a first resistor 46 from a supply rail Vcc. The phototransistor 44 developes an output voltage representative of the intensity of light incident thereon across a second resistor 48. A first voltage comparator 50 provides a logically-true output on the output line 36 whenever the voltage developed across the second resistor 48 exceeds a reference input voltage VREF.

Figure 5:
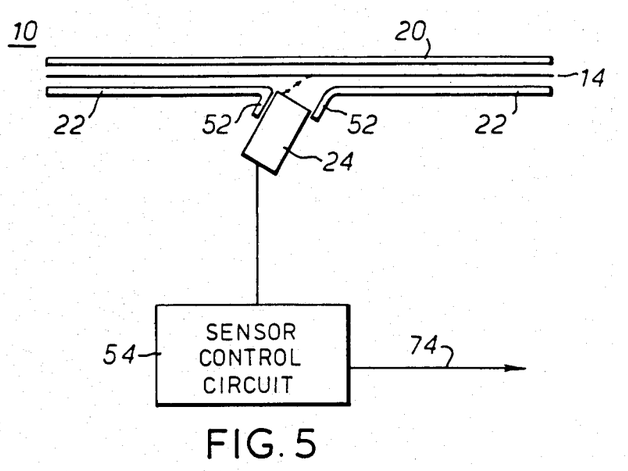
FIG. 5 shows a stop-and-display station comprising the preferred embodiment of the present invention.

FIG. 5 shows a stop-and-display station 10 embodying the present invention.

The reflective photosensor assembly 24 otherwise shown in FIG. 2 is held within angled lips 52 on the the second wall 22 to project a beam of light at an angle onto the document or check 14 such that the sepcularly reflected component from the document 14 or the inner surface of the front wall 20 of the beam of light from the light-emitting diode 42 does not return to the phototransistor 44. The intensity of the light beam is modulated by a sensor-control circuit 54 and signals recovered from the phototransistor 44 are monitored and processed by the sensor-control circuit 54.

Figure 6:
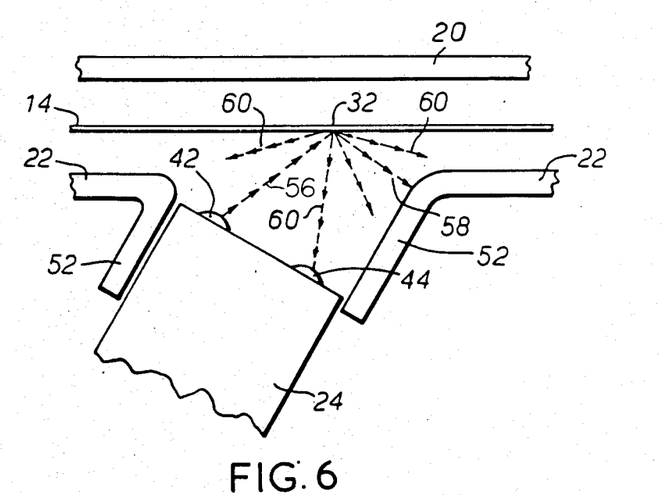
FIG. 6 shows detail of the manner in which scattered reflection from a check or document is employed in the present invention.

FIG. 6 shows enlarged detail of the angled photosensor assembly 24 of FIG. 5. The emerging beam of light 56 from the light-emitting diode 42 strikes the document or check 14 proximately to the common area 32. The specularly-reflected beam 58 from the common area 32 does not return to the phototransistor 44, but is reflected instead onto the angled lips 52 of the second wall 22. Many scatter-reflected beams 60 are returned from the common area 32. Some of the beams enter the phototransistor 44 which turns them into an electrical signal modulated in sympathy with the modulation upon the beam 56 from the light-emitting diode 42. The material of the angled lips 52 and of the second wall 22 is preferably non light-reflective so that the specularly-reflected beam 58 cannot itself produce scattered reflected rays as a result of striking the angled lips 52 or the second wall 22.

With reference to FIG. 6, if the document or check 14 were not present, the beam 56 from the light-emitting diode 42 would strike the inner surface of the transparent front wall 20. The transparent front wall 20 would specularly reflect the beam 56 from the light-emitting diode 42 to strike the second wall 22. In the prior art, good specular reflection from the front wall 20 was a disadvantage in that it produced a good return beam for the photosensor. The functioning of the present invention functions better the better specular reflection from the first wall 20 in that the first wall 20 directs the specularly-reflected beam away from the phototransistor 44. The better the quality of the specular reflection the less the scattered light reaches the phototransistor 44. The present invention thereby avoids a compromise condition in the prior art (see FIG. 3A) where good signal-to-noise ratio required an impairment to the transparency of the first wall 20.

The rendering of the material of the second wall 22 non-reflective ensures that rays of light from external sources cannot be multiply-reflected between the first wall 20 and the second wall 22 to arrive at the phototransistor 44.

Figure 7:
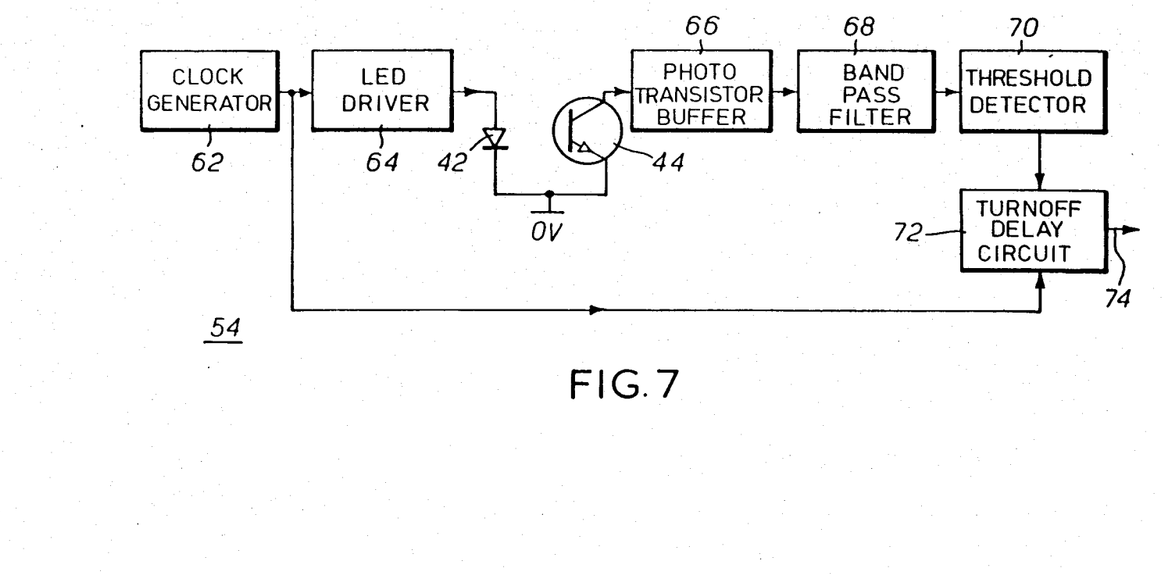
FIG. 7 is a block diagram of the various components of the sensor control circuit of FIG. 5.

FIG. 7 shows a block diagram of the sensor-control circuit 54 of FIG. 5.

A clock generator circuit 62 generates as an output a regularly repetitive clock signal at a predetermined frequency. The output of the clock generator circuit 62 is provided as input to a light-emitting diode driver 64 which, in turn, modulates the current in the light-emitting diode 42 in sympathy with the output clock signal from the clock generator circuit 62. In the preferred embodiment, the current through the light-emitting diode is periodically reduced to zero to produce one hundred per cent modulation of the light output beam 56 from the light-emitting diode 42. Those skilled in the art will be aware that the present invention will function with modulation depths less than one hundred per cent.

The phototransistor 44 produces an output signal representative of the instantaneous light intensity incident thereon. The output signal of the phototransistor 44 is coupled as input to a phototransistor buffer amplifier 66 whose output is a representative analogue of its input.

The output of the buffer amplifier 66 is provided as input to a band-pass filter 68. The band-pass filter 68 provides as its output only those components of its input signal which lie within a predetermined range of frequencies about the predetermined frequency of the clock generator 62. The band-pass filter 68 thus serves to filter out signals picked up by the phototransistor 44 having an origin other than from the light-emitting diode 42.

The predetermined frequency of the clock generator 62 is chosen to differ from the frequency on any modulated extraneous light source which may provide light falling upon the phototransistor 44. Of particular interest are fluorescent lights whose light output contains components at either 120 Hz or 100 Hz and at Harmonics thereof. In the case of the preferred embodiment, the frequency of the clock generator 62, that is, the predetermined frequency is chosen to be 930 Hz. This places the predetermined frequency 30 Hz away both from the 8th Harmonic of 120 Hz viz., 960 Hz and the 9th Harmonic of 100 Hz, namely 900 Hz. The band width of the band-pass filter 68 is then made to pass a band within ±25 Hz of 930 Hz, thus avoiding the through-passage of components at 900 Hz and at 960 Hz.

The above example for calculating the predetermined frequency of the generator 62 and for calculating the band width of the band-pass filter 68 are given by way of example only. In environments with low electrical noise, and where the high-order Harmonics of fluorescent light modulation are low, it will not be necessary to place such a stringently narrow restriction upon the pass band of the band-pass filter 68. It is to be emphasized that the effect of the band-pass filter 68 is not only to eliminate extraneously received modulated light sources from contributing to the overall signal, but also to exclude any extraneous electrical noise received from any other source by the phototransistor buffer amplifier 66. This permits the mounting of the phototransistor 44 at some distance from the buffer 66.

The output of the band-pass filter 68 is a substantially sinusoidal voltage at around about the predetermined frequency 62. The output of the band-pass filter 68 is provided as an input to a threshold detector 70 which provides an output pulse each time the output of the band-pass filter 68 exceeds a predetermined amplitude. The output of the threshold detector 70 is thus a pulse for each cycle provided by the clock generator 62. The frequency of the output pulse stream from the threshold detector 70 is thus the same as the predetermined frequency.

The output pulse stream of the threshold detector circuit 70 is provided as input to a turn-off delay circuit 72. As soon as the threshold detector 70 provides an output pulse, the turn-off delay circuit 72 latches that pulse and provides a latched output indicative thereof on an output line 74. The output line 74 corresponds in its function to the output line 36 otherwise shown in FIG. 4. The turn-off delay circuit 72 is also in receipt of the clock signal from a clock generator 62. Should the threshold detector 70 cease to provide output pulses for longer than a predetermined period, the turn-off delay circuit 72 unlatches its output to drop the signal on the output line 74. The signal on the output line 74 when logically-true signals to the external control system that a document is present in the stop-and-display station 10. When the signal on the output line is dropped, it signifies that a document 14 no longer occupies the stop-and-display station 10. In order to measure the predetermined period, the turn-off delay circuit 72 counts clock pulses from the clock generator 62 and if three or more clock pulses are received during which time no output has been received from the threshold detect 70, the signal on the output line 74 is dropped.

Figure 8:
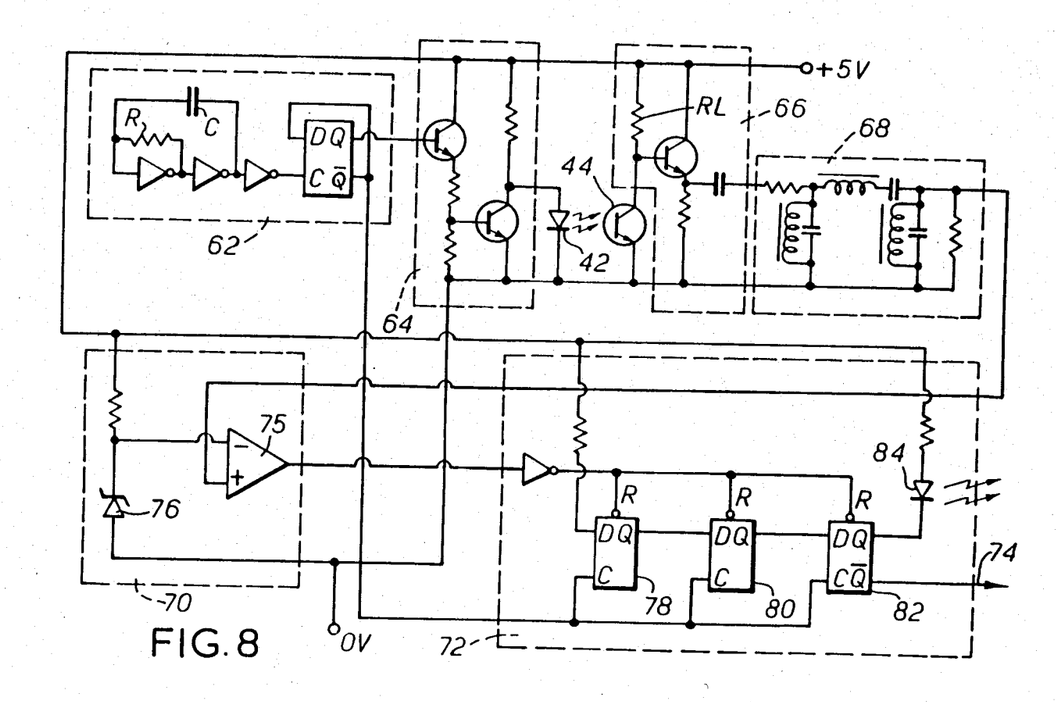
FIG. 8 is an exemplary circuit diagram of a possible embodiment of the block diagram shown in FIG. 7.

FIG. 8 shows an exemplary circuit embodiment of the block diagram of FIG. 7. The clock generator circuit 62 comprises a self-oscillating chain of logic inverter gates together with a toggling D-type flip-flop to provide an equal mark-to-space ratio. The self-oscillating chain has a period determined by passive components RC, and oscillate at twice the predetermined frequency. The self-toggling D-type flip-flop divides the frequency of the self-oscillating chain by two as it equalizes the mark-to-space ratio.

The light-emitting diode driver circuit 64 is in receipt of the output from the toggling flip-flop and periodically shunts the light-emitting diode 42 at the predetermined frequency to provide one hundred per cent modulation of the light beam 56.

The phototransistor buffer circuit 66 consists in an impedance-matching emitter follower stage in receipt of the signal from a load-resistor RL on the phototransistor 44.

The band-pass filter circuit 68 comprises a simple LC multi-pole passive filter as illustrated. Such a filter is completely conventional in design and rules for its design can be found in "Network Analysis and Synthesis" by KUO.

The threshold detection circuit 70 comprises a simple comparator 75 in receipt of the output of the band-pass filter 68 as a non-inverting input and in receipt of a reference voltage level from a Zener diode 76 as a second input. Whenever the output signal from the band-pass filter 68 exceeds the voltage from the Zener diode 76, the comparator 75 provides a logically-true output pulse.

The turn-off delay circuit 72 consists in a shift register chain comprising first, second and third D-type flip-flops 78,80,82. All of the flip-flops 78,80,82 are reset whenever the output of the comparator 75 goes logically-true. Thus, each of the flip-flops 78,80,82 has its output Q set to logical zero upon the receipt of each pulse at the predetermiend frequency from the comparator 75. Each of the flip-flops 78,80,82 is clocked by the toggling flip-flop in the clock generator circuit 62. Whenever the comparator 75 ceases to provide output pulses, a logical one condition provided on the data input D of the first flip-flop 78 in the shift register 78,80,82 is propagated with each clock pulse from the clock generator 62. The logical one input condition upon receipt of the first clock pulse is transferred to the output Q of the first flip-flop 78 which output is also connected as the input B of the second flip-flop 80. Upon receipt of the second clock pulse in the absence of pulses from the comparator 75, the logical one condition on the input B of the second flip-flop 80 is transferred to its output Q which is also coupled as the input B of the third and last flip-flop 82. Upon receipt of a third clock pulse from the clock generator circuit 62, the logical one provided at the input B of the third and last flip-flop 82 is transferred to the output Q of the third flip-flop 82. The inverted output $\overline{Q}$ of the third flip-flop 82 is coupled as the output line 74. Thus whenever the comparator 75 first produces an output pulse in response to a document 14 entering the stop-and-display station 10, the flip-flops 78,80,82 are reset, and the signal on the output line 74 becomes logically-true indicatively of a document 14 being present. If, for any reason, the comparator 75 ceases to produce output pulses for a period of three clock cycles at the predetermined frequency or longer, the signal on the output line 74 becomes logically-false indicating the non-presence of a document. In this way, writing or other marks on the back of the document cannot cause the third and last flip-flop 82 to change its condition, and a document 14 can enter the stop-and-display station 10 without causing rapid changes in the signal on the output line 74.

An indicator light-emitting diode 84 is coupled to the third and last flip-flop 82 to light whenever a document or check 14 is detected in the stop-and-display station 10 to provide the operator with confirmation of function.

Those skilled in the art will be aware that the clock generator 62 can be implemented in other ways. In those cases where particular stability is required, a crystal oscillator can have its frequency divided to provide the predetermined frequency. The crystal oscillator can be derived from the clock signals in the overall control system of the document-handling system.

Those skilled in the art will be aware that, whereas the buffer amplifier 66 shown in FIG. 8 has a gain substantially equal to unity, gains greater or less than unity can be accommodated within the present invention.

Those skilled in the art will also be aware that the band-pass filter circuit 68, as shown herein as a passive LC circuit, can be implemented in various forms employing feedback operational amplifier in active filter circuits. Those skilled in the art will also be aware that, under circumstances of near saturation in the output of the phototransistor 44, it may be advantageous to juxtapose the buffer amplifier 66 and the band-pass filter 68 such that the band-pass filter 68 preceeds the buffer amplifier 66. Those skilled in the art will also be aware that no change of function is caused if the band-pass filter 68 is also provided with its own buffering amplifier.

The threshold detection circuit 70 may be implemented in various other ways using Schmitt trigger integrated circuits, operational amplifier, and the like. The reference voltage herein shown as being derived from a Zener diode 76 can be derived in other ways and can be made proportional to the means level of signal provided by the phototransistor 44 by means of diode detection circuits known in the art.

The turn-off delay circuit 72 can be implemented using monostable timers to time out over the predetermined period, the monostable timer being continuously reset by pulses from the comparator 75 or its equivalent. Similarly, the function of the shift register flip-flops 78,80,82 can be taken over by means of a state sequence counter such as the 7490 TTL integrated circuit. The output from the counter can be decoded and a separate latch in place of the last flip-flop 82 provided. Whilst the count required before turn-off of the signal on the output line 74 is allowed as hereinbefore been described as a count of three, it is to be appreciated that the count can be greater than or less than three.

When the document 14 has been in the stop-and-display station 10 for sufficiently long to be released therefrom, either after a predetermined time or after indication has been provided by the operator that the document 14 is not longer required to be displayed, the system withdraws the pin 18 and moves the document or check 14 out of the stop-and-display station 10 along the track 12 in the direction of the first arrow 16.

We claim:

1. An apparatus for sensing the presence of a document stopped in a track in a stop-and-display station, said stop-and-display station including a first transparent wall wherethrough the document can be viewed and a second wall for supporting the document against said first wall, said apparatus comprising:
    a light source in said second wall for projecting a beam of light, intensity-modulated with a predetermined frequency of modulation, at a predetermined angle of incidence onto a document intermediate between said first and second walls;
    a photosensor, also in said second wall, positioned to intercept light from said beam scattered by the document without intercepting light from said beam specularly reflected by the document, said photosensor being operable to provide an output signal representative of the instant intensity of light incident thereon;
    a band-pass filter coupled to receive as input said output signal from said photosensor and operable to provide as output those components of its input lying within a predetermined range of said predetermined frequency; and
    a threshold detector, coupled to receive said output of said band-pass filter, and operable to provide output, indicative of a document being intermediate said first and second walls at each cycle of said output of said band-pass filter exceeding a predetermined amplitude.

2. An apparatus according to claim 1 further comprising a turnoff delay circuit, coupled to receive said output from said threshold detector, operable to latch said indication from said threshold detector at the instant of first receipt thereof, and operable to cease said latching of said indication from said threshold detector if and only if a repetition of said indication from said threshold detector has not been received within a predetermined period, said latched indication being provided as said output of said apparatus.

3. An apparatus according to claim 2 comprising a clock generator circuit for generating a clock signal, regularly repetitious at said predetermined frequency and a driver circuit, coupled to receive said clock signal and operable to modulate the intensity of said light source in synchronization therewith.

4. An appartus according to claim 3 wherein said turnoff delay circuit comprises a counter, reset in response to each instance of said receipt of said indication from said threshold circuit, coupled to receive said clock signal, operable to be incremented at each instance of receipt of said clock signal and operable to cause said cessation of said latching of said indication whenever the count in said counter equals or exceeds a predetermned number.

5. An apparatus according to claim 4, wherein said counter comprises a serial shift register comprising a plurality of stages, each stage in said shift register being resettable in response to said receipt of said indication from said threshold detector and each stage in said shift register being operable to propagate a logical input signal by one stage from an input stage of said shift register towards an output stage of said shift register in response to said each instance of said receipt of said clock signal, the condition of the output of said last stage being provided as said latched indication and said output of said last stage being altered in response to the propagation thereto of said logical input condition.

6. An apparatus according to claim 2 comprising a clock generator circuit for generating a clock signal, regularly repetitious at said predetermined frequency and a driver circuit, coupled to receive said clock signal and operable to modulate the intensity of said light source in synchronization therewith.

7. An apparatus according to claim 6 wherein said turnoff delay circuit comprises a counter, reset in response to each instance of said receipt of said indication from said threshold circuit, coupled to receive said clock signal, operable to be incremented at each instance of receipt of said clock signal and operable to cause said cessation of said latching of said indication whenever the count in said counter equals or exceeds a predetermined number.

8. An apparatus according to claim 7 wherein said counter comprises a serial shift register comprising a plurality of stages, each stage in said shift register being resettable in response to said receipt of said indication from said threshold detector and each stage in said shift register being operable to propagate a logical input signal by one stage from an input stage of said shift register towards an output stage of said shift register in response to said each instance of said receipt of said clock signal, the condition of the output of said last stage being provided as said latched indication and said output of said last stage being altered in response to the propagation thereto of said logical input condition.

9. An apparatus according to claim 1 comprising an optical support assembly for the common support of said light source and of said photosensor for said photosensor and said light source to be interactive with a common area on the document.

10. An apparatus according to claim 9 wherein said optical support assembly is angled with respect to said second wall for said common area to be displaced from that position whereat specular reflection of said light beam from the document would otherwise cause said specularly reflected light beam to be incident upon said photosensor.

11. An apparatus according to claim 2 comprising an optical support assembly for the common support of said light source and of said photosensor for said photosensor and said light source to be interactive with a common area on the document.

12. An apparatus according to claim 11, wherein said optical support assembly is angled with respect to said second wall for said common area to be displaced from that position whereat specular reflection of said light beam from the document would otherwise cause said specularly reflected light beam to be incident upon said photosensor.

13. An apparatus according to claim 3 comprising an optical support assembly for the common support of said light source and of said photosensor for said photosensor and said light source to be interactive with a common area on the document.

14. An appartus according to claim 13, wherein said optical support assembly is angled with respect to said second wall for said common area to be displaced from that position whereat specular reflection of said light beam from the document would otherwise cause said specularly reflected light beam to be incident upon said photosensor.

15. An apparatus according to claim 4 comprising an optical support assembly for the common support of said light source and of said photosensor for said photosensor and said light source to be interactive with a common area on the document.

16. An apparatus according to claim 15, wherein said optical support assembly is angled with respect to said second wall for said common area to be displaced from that position whereat specular reflection of said light beam from the document would otherwise cause said specularly reflected light beam to be incident upon said photosensor.

17. An apparatus according to claim 5 comprising an optical support assembly for the common support of said light source and of said photosensor for said photosensor and said light source to be interactive with a common area on the document.

18. An apparatus according to claim 17, wherein said optical support assembly is angled with respect to said second wall for said common area to be displaced from that position whereat specular reflection of said light beam from the document would otherwise cause said specularly reflected light beam to be incident upon said photosensor.

19. An apparatus according to claim 6 comprising an optical support assembly for the common support of said light source and of said photosensor for said photosensor and said light source to be interactive with a common area on the document.

20. An apparatus according to claim 19, wherein said optical support assemlby is angled with respect to said second wall for said common area to be displaced from that position whereat specular reflection of said light beam from the document would otherwise cause said specularly reflected light beam to be incident upon said photosensor.

21. An apparatus according to claim 7 comprising an optical support assembly for the common support of said light source and of said photosensor for said photosensor and said light source to be interactive with a common area on the document.

22. An apparatus according to claim 21, wherein said optical support assembly is angled with respect to said second wall for said common area to be displaced from that position whereat specular reflection of said light beam from the document would otherwise cause said specularly reflected light beam to be incident upon said photosensor.

23. An apparatus according to claim 8 comprising an optical support assembly for the common support of said light source and of said photosensor for said photosensor and said light source to be interactive with a common area of the document.

24. An apparatus according to claim 23, wherein said optical support assembly is angled with respect to said second wall for said common area to be displaced from that position whereat specular reflection of said light beam from the document would otherwise cause said specularly reflected light beam to be incident upon said photosensor.

25. An apparatus according to claim 1, wherein said light source is a light emitting diode and wherein said photosensor comprises a phototransistor.

26. An apparatus according to claim 1, wherein said second wall comprises a non-reflective surface adjacent to said first wall.

27. An apparatus according to claim 1, wherein said photosensor is positioned so as not to intercept said light beam, specularly reflected from said first wall in the absence of a document being intermediate between said first and second walls.

28. An apparatus according to claim 1, wherein said predetermined frequency is chosen for no frequency component of ambient lighting to lie within said predetermined range of said predetermined frequency, whereby said sensing of a document is unimpaired by said photosensor being in receipt of ambient light through said transparent first wall.

* * * * *